(12) United States Patent
Oh et al.

(10) Patent No.: US 7,982,429 B1
(45) Date of Patent: Jul. 19, 2011

(54) CHARGE EQUALIZATION APPARATUS

(75) Inventors: Jeon Keun Oh, Daejeon (KR); Joong Hui Lee, Daejeon (KR); Soo Yeup Jang, Daejeon (KR); Gun Woo Moon, Daejeon (KR); Chong Eun Kim, Daejeon (KR); Hong Sun Park, Daejeon (KR)

(73) Assignees: SK Energy Co., Ltd., Seoul (KR); Korea Advanced Institute of Science and Technology, Seoul (KR)

( * ) Notice: Subject to any disclaimer, the term of this patent is extended or adjusted under 35 U.S.C. 154(b) by 0 days.

(21) Appl. No.: 12/971,941

(22) Filed: Dec. 17, 2010

Related U.S. Application Data

(62) Division of application No. 12/303,315, filed as application No. PCT/KR2007/002842 on Jun. 13, 2007, now Pat. No. 7,880,433.

(30) Foreign Application Priority Data

Jun. 15, 2006 (KR) .................. 10-2006-0054062

(51) Int. Cl.
*H02J 7/00* (2006.01)
(52) U.S. Cl. .................. 320/118; 320/119; 320/122
(58) Field of Classification Search .................. 320/120
See application file for complete search history.

(56) References Cited

U.S. PATENT DOCUMENTS

| | | | |
|---|---|---|---|
| 4,079,303 A | 3/1978 | Cox | |
| 5,594,320 A | 1/1997 | Pacholok et al. | |
| 5,965,996 A | 10/1999 | Arledge et al. | |
| 6,100,663 A | 8/2000 | Boys et al. | |
| 6,150,795 A * | 11/2000 | Kutkut et al. | 320/118 |
| 6,373,223 B1 | 4/2002 | Anzawa et al. | |
| 6,538,414 B1 | 3/2003 | Tsuruga et al. | |
| 6,586,910 B2 * | 7/2003 | Matsui et al. | 320/122 |
| 6,642,693 B2 * | 11/2003 | Anzawa et al. | 320/119 |
| 6,670,789 B2 | 12/2003 | Anzawa et al. | |
| 6,791,297 B2 | 9/2004 | Ott et al. | |
| 7,061,207 B2 | 6/2006 | Patel et al. | |

* cited by examiner

*Primary Examiner* — Edward Tso
*Assistant Examiner* — Ramy Ramadan
(74) *Attorney, Agent, or Firm* — McDermott Will & Emery LLP

(57) ABSTRACT

The present invention relates to a charge equalization apparatus, which allows the primary and secondary windings of a transformer to be easily fabricated, can control the flow of charge to batteries depending on the charged states of series-connected batteries, and can prevent overcurrent from flowing into a battery currently being charged.

11 Claims, 11 Drawing Sheets

CHARGE EQUALIZATION APPARATUS

CROSS-REFERENCE OF RELATED APPLICATION

This application is a Divisional of U.S. patent application Ser. No. 12/303,315, now U.S. Pat. No. 7,880,433, filed on Dec. 3, 2008, which is the US National Phase Application under 35 U.S.C. §371 of International Application No. PCT/KR2007/002842 filed on Jun. 13, 2007, which claims the benefit of priority to Korean Patent Application No. 10-2006-0054062, filed on Jun. 15, 2006, each of which are hereby incorporated by reference in their entireties. The International Application was published as WO 2007/145463 on Dec. 21, 2007.

TECHNICAL FIELD

The present invention relates, in general, to a battery voltage equalization apparatus, and, more particularly, to a charge equalization apparatus, which allows the primary and secondary windings of a transformer to be easily fabricated, can control the flow of charge to batteries depending on the charged states of series-connected batteries, and can prevent overcurrent from flowing into a battery currently being charged.

BACKGROUND ART

Many systems use batteries each formed of a battery pack or battery array, including a plurality of battery cells connected in series to each other.

When such battery cells are charged to voltages significantly higher than voltages within a rated charge range or discharged to voltages lower than voltages within a rated charge range, they may be dangerous.

The imbalance between the charged states of battery cells is caused by various factors, and occurs during the manufacture of batteries or the charge/discharge of batteries. In the case of lithium ion cells, the manufacture of cells is strictly controlled in a factory to minimize the differences between the capacities of the cells of a battery array. However, imbalance or inequality between cells may occur due to various factors, regardless of the states of the cells, in which balance or equality was achieved in a factory after the cells were initially manufactured.

The factors influencing the imbalance of cells may include, for example, the chemical reactions, impedances and self-discharge rates of respective cells, the reduction of the capacities of the cells, variation in the operating temperatures of the cells, and different types of variation between the cells.

The inconsistency between the temperatures of cells is an important factor responsible for causing imbalance in cells. For example, "self-discharge" is caused in a battery cell, and is a function of battery temperature. A battery having a high temperature typically has a self-discharge rate higher than that of a battery having a low temperature. As a result, the battery having a high temperature exhibits a lower charged state than the battery having a low temperature over time.

Imbalance is a very series problem in the charged state of a battery. For example, the ability of a battery to supply energy is limited by a battery cell having the lowest charged state, which may typically occur in electric vehicles.

If the battery cell is fully consumed, other battery cells lose the ability to continue to supply energy. This is the same even if the other battery cells of the battery still have the ability to supply power. Therefore, an imbalance in the charged state of battery cells reduces the power supply ability of the battery.

Of course, the above description does not mean that, when one or more battery cells are consumed, the supply of power by the remaining battery cells is completely impossible. However, it means that, in the case of series connection, even if one or more battery cells are fully consumed, the battery can be continuously used as long as charge remains in the remaining battery cells, but, in that case, voltage having a reversed polarity is generated in the battery cell for which discharge has been completed, with the result that the battery cell may be in danger of explosion due to the overheating thereof or the generation of gas, and thus the battery loses power supply ability.

Various methods of correcting the imbalance between the charged states of battery cells have been proposed, and one of the methods is shown in FIG. 1.

FIG. 1 is a diagram showing a prior art centralized charge equalization apparatus.

Referring to FIG. 1, the prior art centralized charge equalization apparatus includes a transformer T, N semiconductor switching elements D1 to Dn, a control switch SW, and a voltage detection and drive signal generation unit 10.

The transformer T includes one primary winding and N secondary windings, the N secondary windings being bound on one common core, and the primary windings and the secondary windings having opposite polarities. In other words, the dot of the primary winding and the dots of the secondary windings are located on different sides. The secondary windings of the transformer T have the same number of turns, and the turns ratio of the primary winding to the secondary windings is N1:N2.

The semiconductor switching elements D1 to Dn are each connected between one end of each of the secondary windings and the positive (+) electrode of each of the batteries B1 to Bn, and rectifies energy that is supplied from each of the secondary windings to each of the batteries B1 to Bn.

The control switch SW is connected in series to the primary windings, and forms a closed circuit in response to a drive signal from the voltage detection and drive signal generation unit 10.

The voltage detection and drive signal generation unit 10 detects respective voltages of the series-connected batteries B1 to Bn, compares the detected voltages with a reference voltage, and generates a drive signal for discharging energy from batteries having voltages higher than the reference voltage, that is, overcharged batteries.

A charge equalization method for the prior art centralized charge equalization apparatus is described below.

First, the voltage detection and drive signal generation unit 10 detects respective voltages of the N series-connected batteries B1 to Bn.

Thereafter, the voltage detection and drive signal generation unit 10 turns on the control switch SW if the voltage of any one of the N series-connected batteries B1 to Bn is higher than a reference voltage.

Accordingly, energy from the N series-connected batteries B1 to Bn is converted into magnetic energy, and is stored in the transformer T of the primary windings.

Thereafter, when the voltage detection and drive signal generation unit 10 turns off the control switch SW, the magnetic energy stored in the primary windings of the transformer T is converted into a charge, and is stored in the N series-connected batteries B1 to Bn via the secondary windings and the semiconductor switching elements D1 to Dn.

In this case, greater charges move to batteries having lower electric potentials via the secondary windings bound on the common core of the transformer T while the control switch SW is turned off, thereby equalizing charges.

However, the prior art centralized charge equalization apparatus has a problem in that it is difficult to fabricate the secondary windings of the transformer T because a number of secondary windings equal to the number of batteries is bound on one common core, so that a number of secondary windings equal to the increased number of series-connected batteries must be bound to one common core.

Furthermore, the prior art centralized charge equalization apparatus has a problem in that the turns ratio of the primary winding to the secondary windings of the transformer T increases in proportion to the number of series-connected batteries, so that it becomes difficult to fabricate primary windings in proportion to the increase in the number of batteries.

DISCLOSURE

Technical Problem

Accordingly, the present invention has been made keeping in mind the above problems occurring in the prior art, and an object of the present invention is to provide a charge equalization apparatus that allows the primary and secondary windings of a transformer to be easily fabricated.

Furthermore, a further object of the present invention is to provide a charge equalization apparatus that is capable of controlling the flow of charges to batteries depending on the charged states of the series-connected batteries.

Finally, another object of the present invention is to provide a charge equalization apparatus that is capable of preventing overcurrent from flowing into a battery currently being charged.

Technical Solution

In order to accomplish the above objects, the present invention provides a charge equalization apparatus, including N transformers connected in parallel to N respective series-connected batteries, and configured to store energy discharged from overcharged batteries among the N batteries and to charge batteries other than the overcharged batteries with the stored energy; N charge control switches each connected between both ends of each of the N transformers; a redistribution switch connected between a common node of a primary winding of an Nth of the transformers and an Nth of the charge control switches and a ground; N first semiconductor switching elements connected in series to respective secondary windings of the N transformers; and a voltage detection and drive signal generation unit configured to detect respective voltages of the N series-connected batteries, and to generate a first drive signal and a second drive signal for driving the charge control switches and the redistribution switch based on the detected voltages.

According to another embodiment of the present invention, there is provided a charge equalization apparatus, including N transformers connected in parallel to N respective series-connected batteries, and configured to each include one primary winding and two secondary windings and to charge batteries, other than the overcharged batteries, with energy discharged from the overcharged batteries; a first charge storage device and a second charge storage device each connected in parallel to the N series-connected battery and the N transformer; a first redistribution switch and a second redistribution switch connected in series between the first and second charge storage devices and the N transformers; charge control switches each connected to both ends of a primary winding of each of the N transformers; N first semiconductor switching elements each connected to a first secondary winding of each of the N transformers and a positive electrode of each of the N batteries; and N second semiconductor switching elements each connected to a second secondary winding of each of the N transformers and a positive electrode of each of the N batteries.

Advantageous Effects

According to the present invention, small-capacity transformers are connected in parallel to series-connected batteries regardless of the number of series-connected batteries, so that not only can excellent charge equalization characteristics be maintained, but the primary and secondary windings of the transformers can also be easily fabricated.

Furthermore, the charge equalization apparatus according to the present invention can control the flow of charge to batteries depending on respective charged states of series-connected batteries with the help of charge control switches connected in parallel to the primary windings of transformers.

Finally, the charge equalization apparatus according to the present invention can prevent overcurrent from flowing into a battery currently being charged by controlling the PWM duty ratio of a second drive signal to be applied to the redistribution switch when overcurrent flows into a small number of batteries at the time that the charge equalization of the batteries is almost completed, or at the time that almost all of the charge control switches are turned on.

Figure 1:
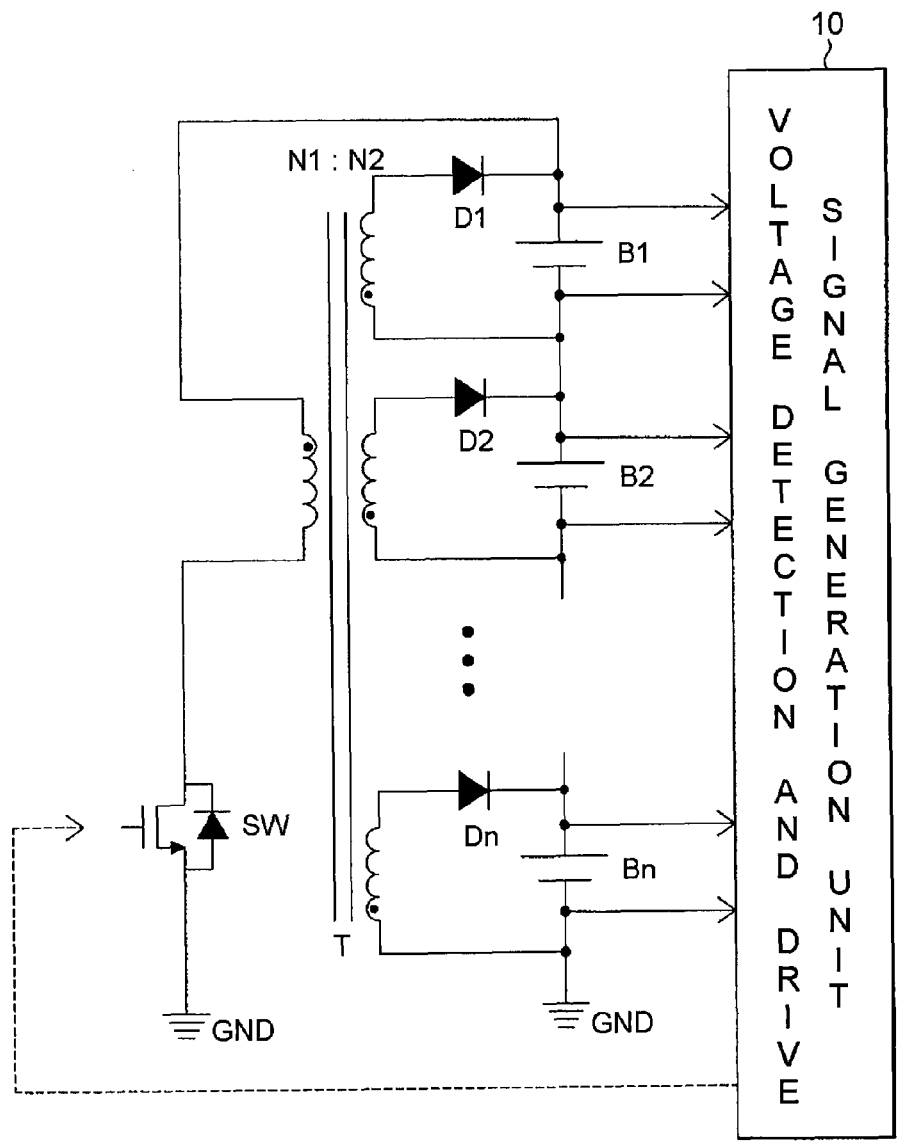
FIG. 1 is a diagram showing a prior art centralized charge equalization apparatus.

BRIEF DESCRIPTION OF REFERENCE CHARACTERS OF PRINCIPAL ELEMENTS IN THE DRAWINGS 10, 20, 30, and 40: voltage detection and drive signal generation unit
22: sensing unit 24: microprocessor
26: switch driving circuit unit

BEST MODE

Embodiments of the present invention are described in detail with reference to the attached drawings below.

Figure 2:
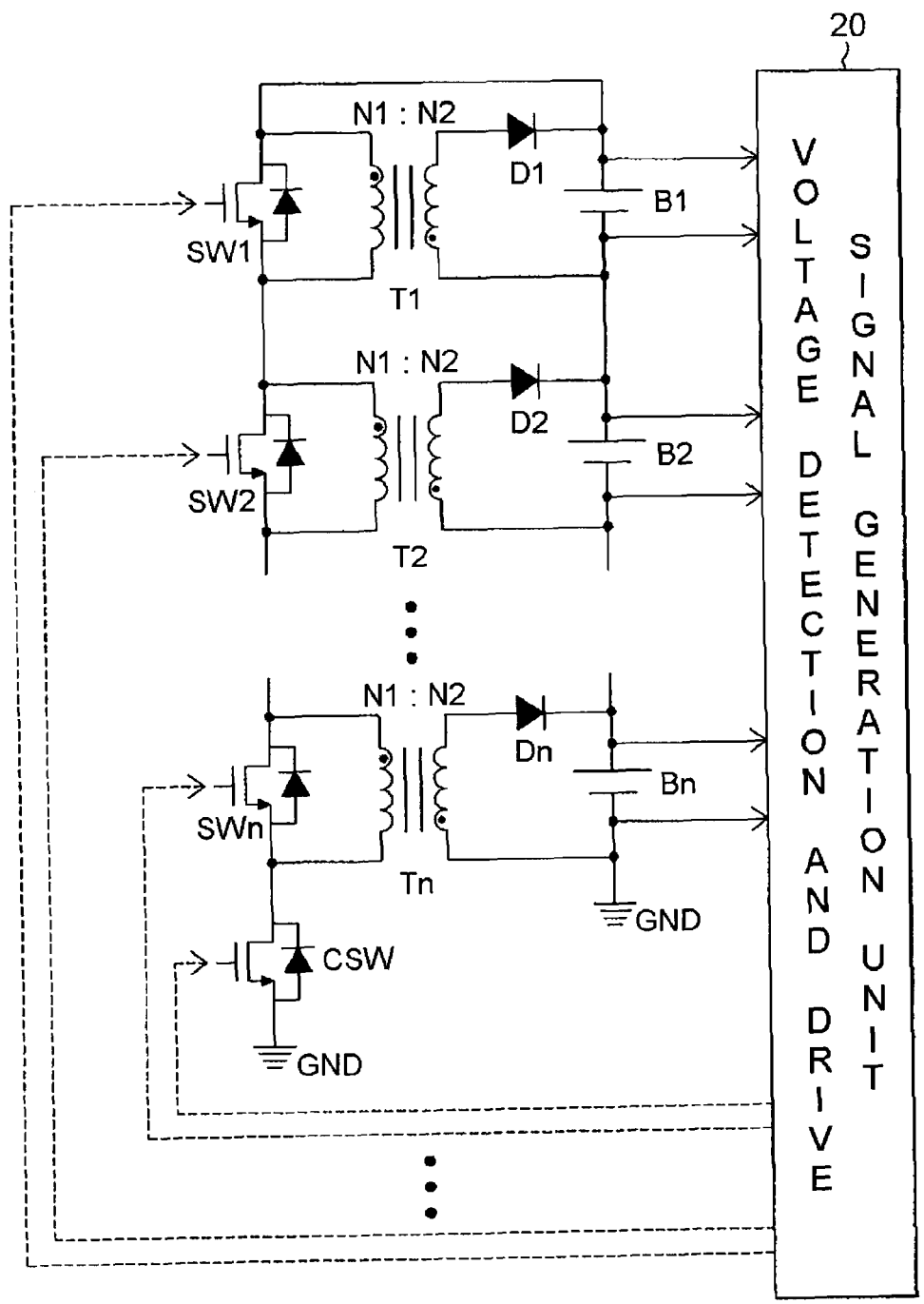
FIG. 2 is a diagram showing a charge equalization apparatus according to an embodiment of the present invention.
Figure 3:
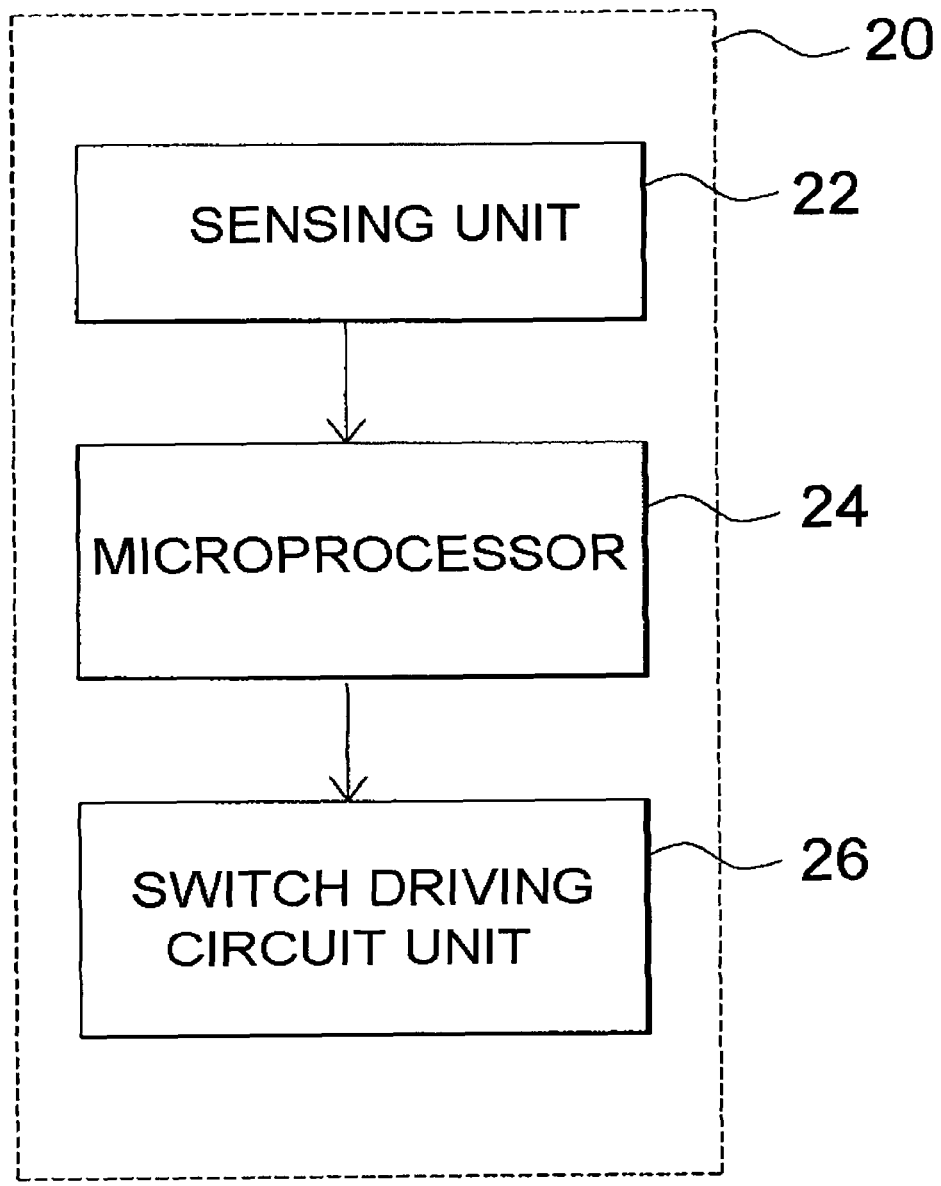
FIG. 3 is a diagram showing the voltage detection and drive signal generation unit shown in FIG. 2.

FIG. 2 is a diagram showing a charge equalization apparatus according to an embodiment of the present invention, and FIG. 3 is a diagram showing the voltage detection and drive signal generation unit 20 shown in FIG. 2.

Referring to FIGS. 2 and 3, the charge equalization apparatus according to the embodiment of the present invention includes N transformers T1 to Tn connected in parallel to N respective series-connected batteries B1 to Bn, N charge control switches SW1 to SWn connected in parallel to respective primary windings of the N transformers T1 to Tn, N semiconductor switching elements D1 to Dn connected in series to respective secondary windings of the transformers T1 to Tn, a redistribution switch CSW connected between an Nth charge control switch SWn and a ground GND, and a voltage detection and drive signal generation unit 20 adapted to detect the voltages of the batteries B1 to Bn and control the operation of the charge control switches SW1 to SWn and the redistribution switch CSW based on the detected values.

The transformers T1 to Tn are connected in parallel to N respective series-connected batteries B1 to Bn so as to reduce the voltages of overcharged batteries among the N series-connected batteries B1 to Bn.

In greater detail, one end of the secondary winding of each of the transformers T1 to Tn is connected to the anode of each of the semiconductor switching elements D1 to Dn, and the cathode of each of the semiconductor switching elements D1 to Dn is connected to the positive (+) electrode of each of the batteries B1 to Bn. The other end of the secondary winding of each of the transformers T1 to Tn is connected to the negative (−) electrode of each of the batteries B1 to Bn.

Although the transformers T1 to Tn are formed in a flyback converter type, in which a primary winding and a secondary winding have opposite polarities, that is, the dot of the primary winding and the dot of the secondary winding are located on different sides, they may be formed in a forward converter type, in which a primary winding and a secondary winding have the same polarity. Here, the turns ratio of the primary winding of each of the transformers T1 to Tn to the secondary winding thereof is the same value, that is, N1:N2.

The charge control switches SW1 to SWn are each connected between both ends of the primary winding of each of the transformers T1 to Tn. In response to a first drive signal from the voltage detection and drive signal generation unit 20, the charge control switches SW1 to SWn form bypass circuits so as to supply energy, discharged from one or more overcharged batteries among the N series-connected batteries B1 to Bn, to the primary windings of transformers connected in parallel to the respective batteries, other than the overcharged batteries, and to prevent current from flowing into the primary windings of the transformers connected in parallel to the overcharged batteries.

For this purpose, charge control switches connected in parallel to the overcharged batteries are supplied with a high-state first drive signal from the voltage detection and drive signal generation unit 20, and charge control switches connected in parallel to the batteries, other than the overcharged batteries, are supplied with a low-state first drive signal.

Accordingly, current flows through the primary windings of transformers connected in parallel to the batteries, other than the overcharged batteries, while current does not flow through the primary windings of transformers connected in parallel to the overcharged batteries because the bypass circuits are formed by the charge control switches.

Although the charge control switches SW1 to SWn are formed of N-type MOSFETs, they are not limited to N-type MOSFETs, but they may each be formed of any one of switching elements such as a MOSFET, a BJT, and a relay.

The semiconductor switching elements D1 to Dn are each connected between one end (the end where no dot is formed) of the secondary winding of each of the transformers T1 to Tn and the positive electrode of each of the batteries B1 to Bn. The semiconductor switching elements D1 to Dn operate such that energy from the secondary windings of the transformers T1 to Tn is supplied to the batteries B1 to Bn.

Although the semiconductor switching elements D1 to Dn are formed of diodes, they may each be formed of any one of switching elements such as a MOSFET, a BJT, a relay, and a diode.

The redistribution switch CSW is connected between the other end (the end where no dot is formed) of the primary winding of the Nth transformer Tn, the other end (source end) of the Nth charge control switch SWn, and the ground GND, forms a closed loop so that energy discharged from the overcharged batteries is supplied to the primary windings of the transformers connected to the batteries, other than the overcharged batteries, and functions to transmit energy, supplied from the primary windings of the primary windings of non-overcharged transformers, to the secondary windings thereof.

In other words, the redistribution switch CSW is turned on in response to a high-state second drive signal from the voltage detection and drive signal generation unit 20, and forms a closed loop so that energy discharged from the overcharged batteries is supplied to the primary windings of transformers connected in parallel to the batteries, other than the overcharged batteries. Furthermore, the redistribution switch CSW is turned off in response to a low-state second drive signal from the voltage detection and drive signal generation unit 20, and transmits energy, stored in the primary windings of the non-overcharged transformers, to the secondary windings thereof.

For this purpose, the redistribution switch CSW operates along with the charge control switches SW1 to SWn, or operates after the charge control switches SW1 to SWn have operated.

Although the redistribution switch CSW is formed of an N-type MOSFET, it is not limited to an N-type MOSFET, but it may be formed of any one of switching elements such as a MOSFET, a BJT, and a relay.

The voltage detection and drive signal generation unit 20 detects respective voltages of the N series-connected batteries B1 to Bn, compares the detected voltages with a reference voltage, generates a first drive signal and a second drive signal for discharging energy from batteries having voltages higher than the reference voltage, that is, overcharged batteries, and charging the batteries, other than the overcharged batteries, when any one of the detected voltages is higher than the reference voltage, and supplies the first and second drive signals to the charge control switches SW1 to SWn and redistribution switch CSW. Here, the reference voltage refers to the average voltage of the voltages detected from the batteries B1 to Bn.

At this time, the voltage detection and drive signal generation unit 20 supplies a high-state first drive signal to charge control switches connected in parallel to the overcharged batteries, and a low-state first drive signal to charge control switches connected in parallel to the batteries, other than the overcharged batteries.

Furthermore, the voltage detection and drive signal generation unit 20 supplies a high-state second drive signal to the redistribution switch CSW when energy is discharged from the overcharged batteries, and a low-state second drive signal to the redistribution switch CSW when the batteries, other than the overcharged batteries, are charged.

In this case, the voltage detection and drive signal generation unit 20 supplies a second drive signal based on narrow duty ratio Pulse Width Modulation (PWM) to the redistribution switch CSW when only a small number of batteries are charged with charges at the time that almost all of the charge control switches are turned on, or at the time that the equalization of the charge of the batteries is almost completed. The reason for this is to discharge a small amount of charge from the N series-connected batteries from the beginning, so as to prevent current from excessively flowing into a battery currently being charged.

Accordingly, the charge control switches connected in parallel to the overcharged batteries are turned on, while the charge control switches connected in parallel to the batteries, other than the overcharged batteries, are turned off. Furthermore, when energy is discharged from the overcharged batteries, the redistribution switch CSW is turned on, and when the batteries, other than the overcharged batteries, are charged, the redistribution switch CSW is turned off.

That is, when the redistribution switch CSW is turned on, the charge control switches connected in parallel to the overcharged batteries form bypass circuits so that current does not flow through the primary windings of the transformers connected in parallel to the overcharged batteries, and energy discharged from the overcharged batteries is stored in the primary windings of the transformers connected in parallel to the batteries, other than the overcharged batteries.

Furthermore, when the redistribution switch CSW is turned off, energy stored in the primary windings of the transformers connected in parallel to the batteries, other than the overcharged batteries, is transmitted to the secondary windings thereof, and the batteries, other than the overcharged batteries, are charged with the energy.

The voltage detection and drive signal generation unit 20 supplies a first drive signal and a second drive signal to the charge control switches SW1 to SWn and the redistribution switch CSW at the same time, or supplies a second drive signal to the redistribution switch CSW after supplying a first drive signal to the charge control switches SW1 to SWn.

For this purpose, the voltage detection and drive signal generation unit 20 includes a sensing unit 22, a microprocessor 24, and a switch driving circuit unit 26.

The sensing unit 22 is connected to respective batteries B1 to Bn, and detects respective voltages of the batteries B1 to Bn.

The microprocessor 24 sets the average voltage of the batteries B1 to Bn, detected by the sensing unit 22, as a reference voltage, and sets the ON/OFF time of the charge control switches SW1 to SWn and the redistribution switch CSW for the charging/discharging of the batteries if a difference equal to or greater than a predetermined value exists between the reference voltage and one of the voltages detected by the sensing unit 22.

The switch driving circuit unit 26 generates a first drive signal and a second drive signal in response to signals from the microprocessor 24, and supplies the generated signals to the charge control switches SW1 to SWn and the redistribution switch CSW.

In the charge equalization apparatus according to the present embodiment of the present invention, small-capacity transformers are connected in parallel to the series-connected batteries B1 to Bn regardless of the number of N series-connected batteries B1 to Bn, so that not only can excellent charge equalization characteristics be maintained, but the primary and secondary windings of the transformers can also be easily fabricated.

Furthermore, the charge equalization apparatus according to the present embodiment of the present invention can control the flow of charge to the batteries depending on respective charged states of the N series-connected batteries B1 to Bn with the help of the charge control switches SW1 to SWn connected in parallel to the primary windings of the transformers T1 to Tn.

Finally, the charge equalization apparatus according to the present embodiment of the present invention can prevent overcurrent from flowing into a battery currently being charged by controlling the PWM duty ratio of a second drive signal that is applied to the redistribution switch CSW when overcurrent flows into a small number of batteries at the time that the charge equalization of the batteries is almost completed, or at the time that almost all of the charge control switches are turned on.

A method of equalizing the voltages of the series-connected batteries using the charge equalization apparatus according to the present embodiment of the present invention is described below.

First, the voltage detection and drive signal generation unit 20 detects respective voltages of the N series-connected batteries B1 to Bn.

At this time, when one or more voltages higher than the reference voltage are detected from one or more of the N series-connected batteries B1 to Bn, the voltage detection and drive signal generation unit 20 generates a first drive signal for driving the charge control switches connected in parallel to the overcharged batteries so as to discharge energy from the overcharged batteries, and supplies the first drive signal to the charge control switches.

For example, when the batteries, other than a first battery B1 and an Nth battery Bn, are overcharged, the voltage detection and drive signal generation unit 20 supplies a low-state first drive signal to charge control switches SW1 and SWn connected in parallel to the first battery B1 and the Nth battery Bn, and supplies a high-state first drive signal to charge control switches connected in parallel to the batteries, other than the first battery B1 and the Nth battery Bn.

At this time, the voltage detection and drive signal generation unit 20 supplies a high-state second drive signal to the redistribution switch CSW.

Figure 4:
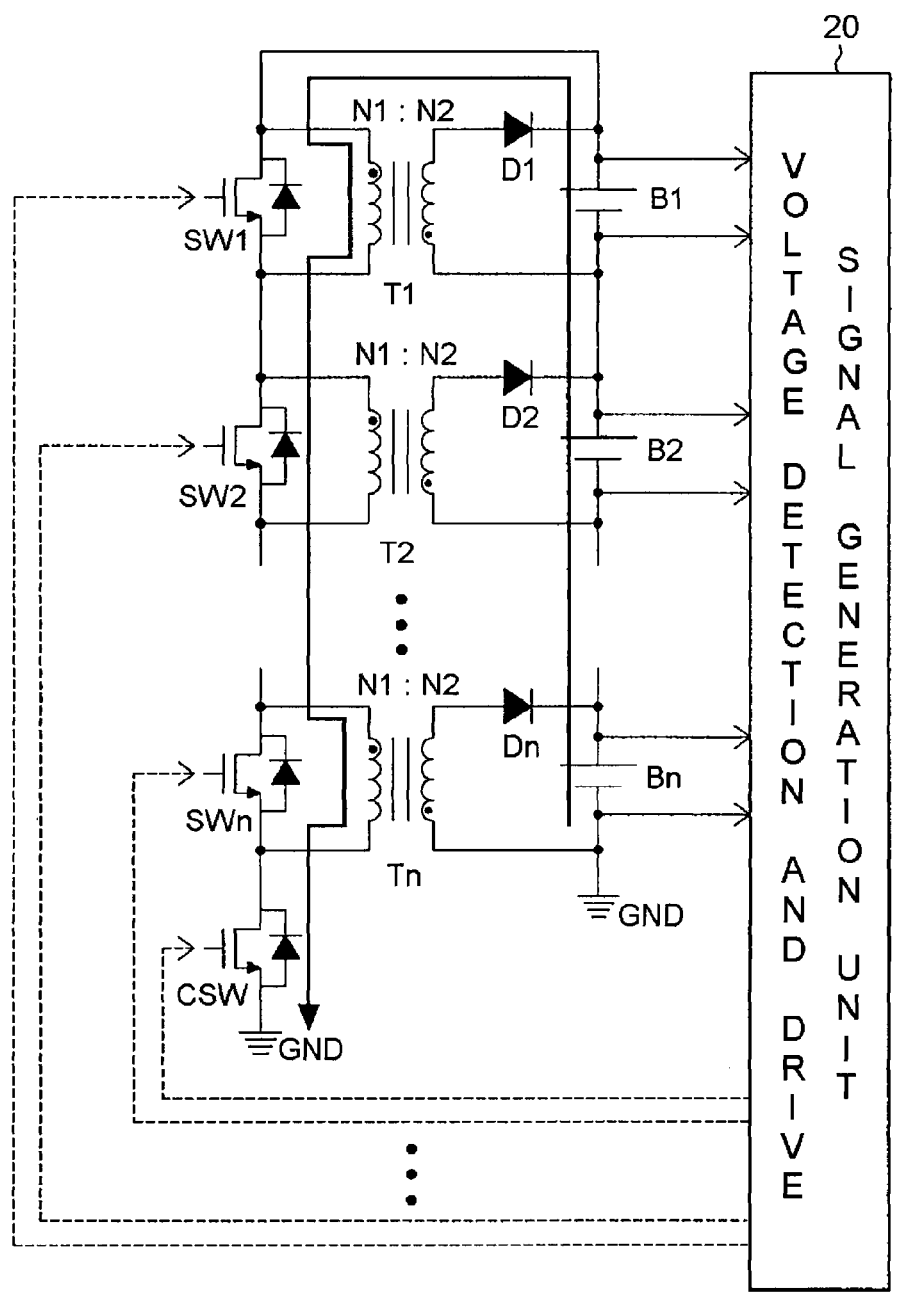
FIGS. 4 and 5 are diagrams showing closed loops for equalizing the charges of batteries in the charge equalization apparatus shown in FIG. 2.

Accordingly, as shown in FIG. 4, charges, discharged from the overcharged batteries, are converted into magnetic energy and are then stored in the primary windings of transformers T1 and Tn connected in parallel to the first battery B1 and the Nth battery Bn, the charge control switches, connected in parallel to the batteries, other than the first battery B1 and the Nth battery Bn, form bypass circuits so that current does not flow through the primary windings of transformers connected in parallel to the batteries, other than the first battery B1 and the Nth battery Bn.

Thereafter, the voltage detection and drive signal generation unit 20 supplies a low-state second drive signal to the redistribution switch CSW, thereby turning off the redistribution switch CSW.

Figure 5:
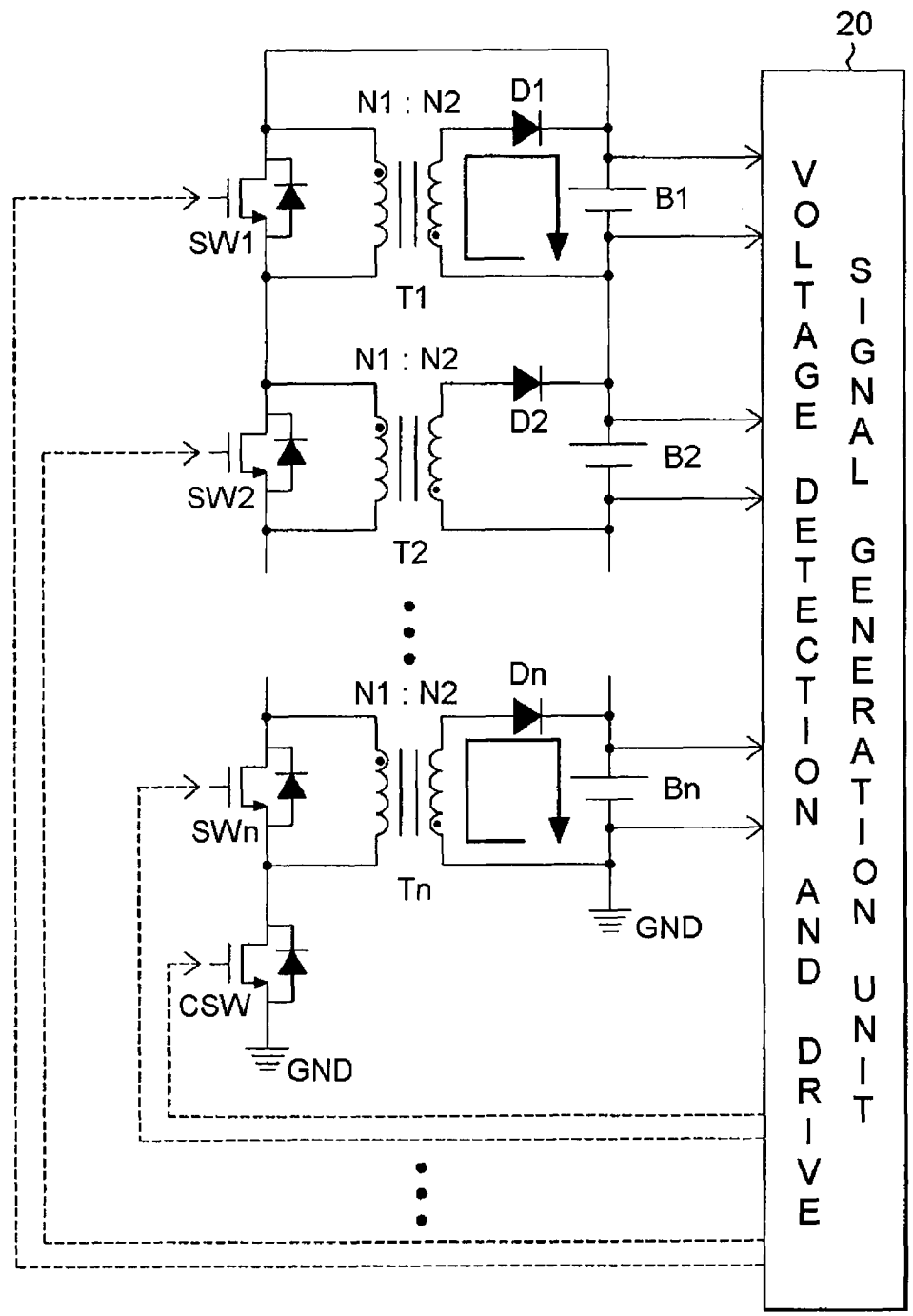

Accordingly, as shown in FIG. 5, counter electromotive force is generated, so that energy, stored in the primary windings of the transformers T1 and Tn, connected in parallel to the first battery B1 and the Nth battery Bn, is transmitted to the secondary windings thereof and is then converted into a charge, and the charge is supplied to the batteries, other than the overcharged batteries, via semiconductor switching elements D1 and Dn connected in series to the secondary windings thereof. Accordingly, the batteries, other than the overcharged batteries, are charged with the charge that is supplied via the semiconductor switching elements D1 and Dn.

The above-described process is repeated until the voltages of the N series-connected batteries B1 to Bn are equalized. For this purpose, the voltage detection and drive signal generation unit 20 continuously detects the voltages of the N series-connected batteries B1 to Bn, generates a first drive signal and a second drive signal, and supplies the first and second drive signals to the charge control switches SW1 to SWn and the redistribution switch CSW.

Figure 6:
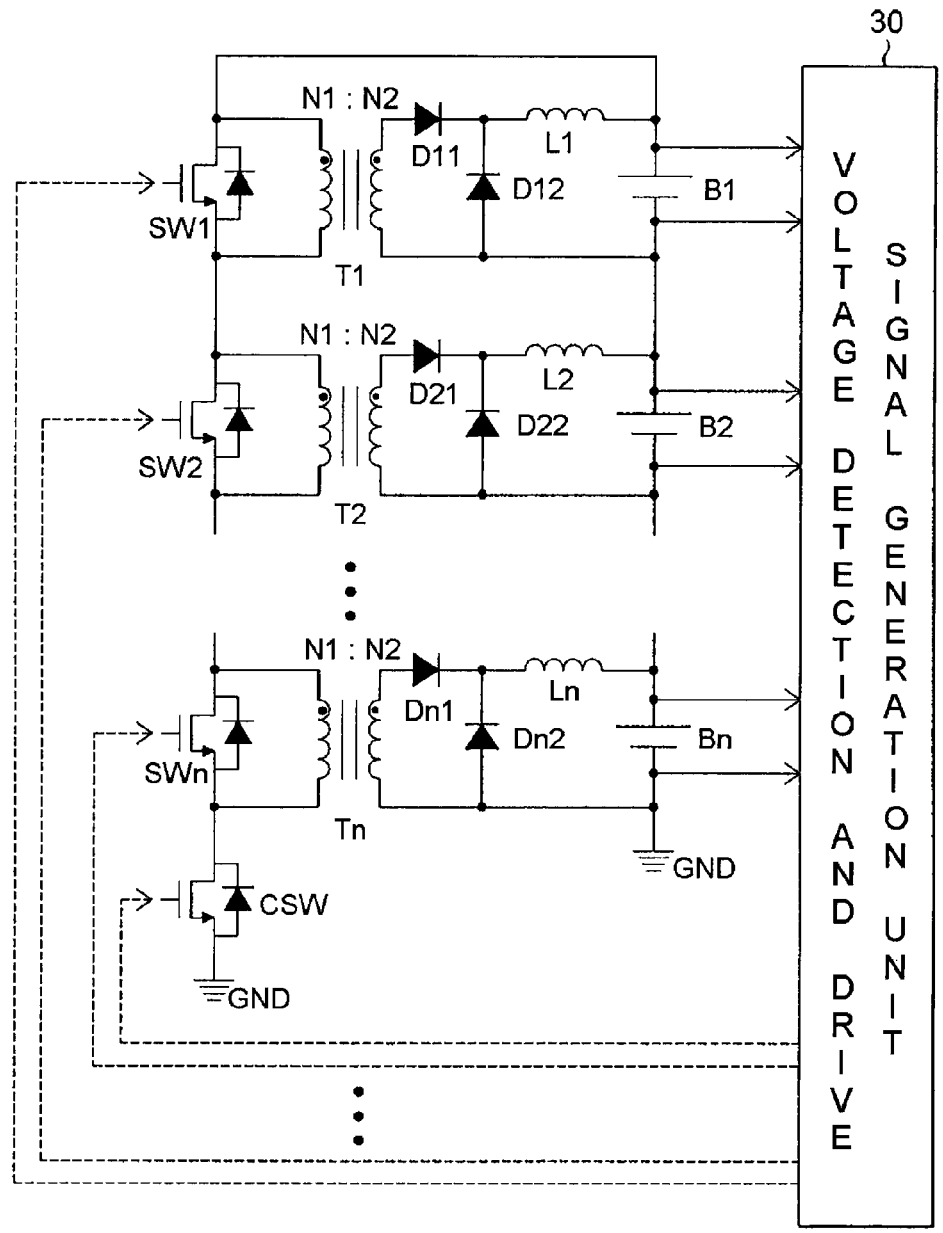
FIG. 6 is a diagram showing a charge equalization apparatus according to another embodiment of the present invention.

FIG. 6 is a diagram showing a charge equalization apparatus according to another embodiment of the present invention.

Referring to FIG. 6, the charge equalization apparatus according to another embodiment of the present invention includes N transformers T1 to Tn connected in parallel to N respective series-connected batteries B1 to Bn, N charge control switches SW1 to SWn connected in parallel to respective primary windings of the N transformers T1 to Tn, first semiconductor switching elements D11 to Dn1 and inductors L1 to Ln each connected in series to the secondary winding of each of the transformers T1 to Tn, second semiconductor switching elements D11 to Dn1 each connected between the negative electrode of each of the batteries B1 to Bn and the common node of each of the first semiconductor switching elements D11 to Dn1 and each of the inductors L1 to Ln, a redistribution switch CSW connected between an Nth charge control switch SWn and a ground GND, and a voltage detection and drive signal generation unit 30 adapted to detect the voltages of the batteries B1 to Bn and control the operation of the charge control switches SW1 to SWn and the redistribution switch CSW based on the detected values.

The transformers T1 to Tn are connected in parallel to N respective series-connected batteries B1 to Bn so as to reduce the voltages of overcharged batteries among the N series-connected batteries B1 to Bn.

In greater detail, one end of the secondary winding of each of the transformers T1 to Tn is connected to the anode of each of the semiconductor switching elements D11 to Dn1, the cathode of each of the semiconductor switching elements D11 to Dn1 is connected to one end of each of the inductors L1 to Ln, and the other end of each of the inductors L1 to Ln is connected to the positive (+) electrode of each of the batteries B1 to Bn. Furthermore, the other end of the secondary winding of each of the transformers T1 to Tn is connected to the negative (−) electrode of each of the batteries B1 to Bn.

Although the transformers T1 to Tn are formed of a forward converter type, in which a primary winding and a secondary winding have the same polarity, that is, the dot of the primary winding and the dot of the secondary winding are located on the same side, they may be formed in a flyback converter type. Here, the turns ratio of the primary winding of each of the transformers T1 to Tn to the secondary winding thereof is N1:N2.

The charge control switches SW1 to SWn are each connected between both ends of the primary winding of each of the transformers T1 to Tn. In response to a first drive signal from the voltage detection and drive signal generation unit 30, the charge control switches SW1 to SWn supply energy, discharged from one or more overcharged batteries among the N series-connected batteries B1 to Bn, to the primary windings of transformers connected in parallel to the respective batteries, other than the overcharged batteries, and form bypass circuits so that current does not flow into the primary windings of the transformers connected in parallel to the overcharged batteries.

For this purpose, charge control switches connected in parallel to the overcharged batteries are supplied with a high-state first drive signal from the voltage detection and drive signal generation unit 30, and charge control switches connected in parallel to the batteries, other than the overcharged batteries, are supplied with a low-state first drive signal.

Accordingly, current flows through the primary windings of transformers connected in parallel to the batteries, other than the overcharged batteries, while current does not flow through the primary windings of transformers connected in parallel to the overcharged batteries because the bypass circuits are formed by the charge control switches.

Although the charge control switches SW1 to SWn are formed of N-type MOSFETs, they are not limited to N-type MOSFETs, but they may each be formed of any one of switching elements such as a MOSFET, a BJT, and a relay.

The first semiconductor switching elements D11 to Dn1 are each connected between one end (the end where a dot is formed) of the secondary winding of each of the transformers T1 to Tn and each of the inductors L1 to Ln, and operate such that energy from the secondary windings of the transformers T1 to Tn is supplied to the batteries B1 to Bn.

Although the first semiconductor switching elements D11 to Dn1 are formed of diodes, they are not limited to diodes, but may each be formed of any one of switching elements such as a MOSFET, a BJT, a relay, and a diode.

The inductors L1 to Ln are each connected between the cathode of each of the first semiconductor switching elements D11 to Dn1 and the positive electrode of each of the batteries B1 to Bn. The inductors L1 to Ln store energy from the secondary windings of the transformers T1 to Tn when the redistribution switch CSW is turned on, and supply the stored energy to the batteries B1 to Bn when the redistribution switch CSW is turned off.

The second semiconductor switching elements D12 to Dn2 are each connected between the negative electrode of each of the batteries B1 to Bn and the common node of each of the first semiconductor switching elements D11 to Dn1 and each of the inductors L1 to Ln, and form closed loops so that the energy stored in the inductors L1 to Ln is supplied to the batteries B1 to Bn.

For this purpose, the anode of each of the second semiconductor switching elements D12 to Dn2 is connected to the negative electrode of each of the batteries B1 to Bn, and the cathode thereof is connected to the cathode of each of the first semiconductor switching elements D11 to Dn1.

Although the second semiconductor switching elements D12 to Dn2 are formed of diodes, they are not limited to diodes, but may each be formed of any one of switching elements such as a MOSFET, a BJT, a relay, and a diode.

The redistribution switch CSW is connected between the other end (the end where no dot is formed) of the primary winding of the Nth transformer Tn and the ground GND, forms a closed loop so that energy discharged from the overcharged batteries is supplied to the batteries, other than the overcharged batteries, via the transformers connected in parallel to the batteries, other than the overcharged batteries, and allows the energy, stored in the inductors L1 to Ln, to be supplied to the batteries, other than the overcharged batteries.

In other words, the redistribution switch CSW is turned on in response to a high-state second drive signal from the voltage detection and drive signal generation unit 30, and forms a closed loop so that energy, discharged from the overcharged batteries, is supplied to the primary windings of transformers connected in parallel to the batteries, other than the overcharged batteries.

Accordingly, energy stored in the primary windings of transformers connected in parallel to the batteries, other than the overcharged batteries, is transmitted to the secondary windings thereof, and is supplied to the batteries, other than the overcharged batteries, via the first semiconductor switching elements D11 and Dn1 and the inductors L1 to Ln. Accordingly, the batteries, other than the overcharged batteries, are charged.

Furthermore, the redistribution switch CSW is turned off in response to a low-state second drive signal from the voltage detection and drive signal generation unit 30, generates counter electromotive force in the inductors L1 to Ln, and allows the batteries, other than the overcharged batteries, to be charged with the energy stored in the inductors L1 to Ln.

The redistribution switch CSW operates along with the charge control switches SW1 to SWn, or operates after the charge control switches SW1 to SWn have operated.

Although the redistribution switch CSW is formed of an N-type MOSFET, it is not limited to an N-type MOSFET, but it may be formed of any one of switching elements such as a MOSFET, a BJT, and a relay.

The voltage detection and drive signal generation unit 30 detects respective voltages of the N series-connected batteries B1 to Bn, compares the detected voltages with a reference voltage, generates a first drive signal and a second drive signal for discharging energy from batteries having voltages higher than the reference voltage, that is, overcharged batteries, and charging the batteries, other than the overcharged batteries, if any one of the detected voltages is higher than the reference voltage, and supplies the first and second drive signals to the charge control switches SW1 to SWn and the redistribution switch CSW.

At this time, the voltage detection and drive signal generation unit 30 supplies a high-state first drive signal to charge control switches connected in parallel to the overcharged batteries, and a low-state first drive signal to charge control switches connected in parallel to the batteries, other than the overcharged batteries.

Furthermore, the voltage detection and drive signal generation unit 30 supplies a high-state second drive signal to the redistribution switch CSW when energy is discharged from the overcharged batteries and the batteries other than the overcharged batteries are charged with the energy, and a low-state second drive signal to the redistribution switch CSW when the batteries other than the overcharged batteries are charged with the energy stored in the inductors L1 to Ln.

In this case, the voltage detection and drive signal generation unit 30 supplies a narrow duty ratio PWM-based second drive signal to the redistribution switch CSW when only a small number of batteries are charged with a charge at the time that almost all of the charge control switches are turned on, or at the time that the equalization of the charge of the batteries is almost completed. The reason for this is to discharge a small amount of charge from the N series-connected batteries from the beginning so as to prevent current from excessively flowing into a battery currently being charged.

Accordingly, the charge control switches connected in parallel to the overcharged batteries are turned on, while the charge control switches connected in parallel to the batteries, other than the overcharged batteries, are turned off. Furthermore, when energy is discharged from the overcharged batteries and the batteries, other than the overcharged batteries, are charged with the energy, the redistribution switch CSW is turned on, and when the batteries, other than the overcharged batteries, are charged, the redistribution switch CSW is turned off.

That is, when the redistribution switch CSW is turned on, the charge control switches connected in parallel to the overcharged batteries form bypass circuits so that current does not flow through the primary windings of the transformers connected in parallel to the overcharged batteries, and charge, discharged from the overcharged batteries, is converted into magnetic energy and is then stored in the primary windings of the transformers connected in parallel to the batteries, other than the overcharged batteries. Furthermore, the energy, stored in the secondary windings of transformers connected in parallel to the batteries, other than the overcharged batteries, is transmitted to the secondary windings of the transformers connected in parallel to the batteries, other than the overcharged batteries, and the magnetic energy transmitted to the secondary windings is converted into charges, and the batteries, other than the overcharged batteries, are charged via the first semiconductor switching elements and the inductors.

Furthermore, when the redistribution switch CSW is turned off, the batteries, other than the overcharged batteries, are charged with the energy stored in the inductors.

The voltage detection and drive signal generation unit 30 supplies a first drive signal and a second drive signal to the charge control switches SW1 to SWn and the redistribution switch CSW at the same time, or supplies a second drive signal to the redistribution switch CSW after supplying a first drive signal to the charge control switches SW1 to SWn.

For this purpose, the voltage detection and drive signal generation unit 30, as shown in FIG. 3, includes a sensing unit 22, a microprocessor 24, and a switch driving circuit unit 26.

The sensing unit 22 is connected to respective batteries B1 to Bn, and detects respective voltages of the batteries B1 to Bn.

The microprocessor 24 sets the average voltage of the batteries B1 to Bn, detected by the sensing unit 22, as a reference voltage, and sets the ON/OFF time of the charge control switches SW1 to SWn and the redistribution switch CSW for the charging/discharging of the batteries when a difference equal to or higher than a predetermined value exists between the reference voltage and one of the detected voltages detected by the sensing unit 22.

The switch driving circuit unit 26 generates a first drive signal and a second drive signal in response to signals from the microprocessor 24, and supplies the generated signals to the charge control switches SW1 to SWn and the redistribution switch CSW.

In the charge equalization apparatus according to the present embodiment of the present invention, small-capacity transformers are connected in parallel to respective series-connected batteries B1 to Bn regardless of the number of N series-connected batteries B1 to Bn, so that not only can excellent charge equalization characteristics be maintained, but the primary and secondary windings of the transformers can also be easily fabricated.

Furthermore, the charge equalization apparatus according to the present embodiment of the present invention can control the flow of charge to the batteries depending on respective charged states of the N series-connected batteries B1 to Bn with the help of the charge control switches SW1 to SWn connected in parallel to the primary windings of the transformers T1 to Tn.

Finally, the charge equalization apparatus according to the present embodiment of the present invention can prevent overcurrent from flowing into a battery currently being charged by controlling the PWM duty ratio of a second drive signal to be applied to the redistribution switch CSW when overcurrent flows into a small number of batteries at the time that the charge equalization of the batteries is almost completed, or at the time that almost all of the charge control switches are turned on.

A method of equalizing the voltages of the series-connected batteries using the charge equalization apparatus according to the embodiment of the present invention is described below.

First, the voltage detection and drive signal generation unit 30 detects respective voltages of the N series-connected batteries B1 to Bn.

At this time, when one or more voltages higher than the reference voltage are detected from one or more of the N series-connected batteries B1 to Bn, the voltage detection and drive signal generation unit 30 generates a first drive signal for driving the charge control switches connected in parallel to the overcharged batteries so as to discharge energy from the overcharged batteries, and supplies the first drive signal to the charge control switches.

For example, when the batteries, other than a first battery B1 and an Nth battery Bn, are overcharged, the voltage detection and drive signal generation unit 30 supplies a low-state first drive signal to charge control switches SW1 and SWn connected in parallel to the first battery B1 and the Nth battery Bn, and a high-state first drive signal to charge control switches connected in parallel to the batteries, other than the first battery B1 and the Nth battery Bn.

Furthermore, the voltage detection and drive signal generation unit 30 supplies the high-state second drive signal to the redistribution switch CSW.

Figure 7:
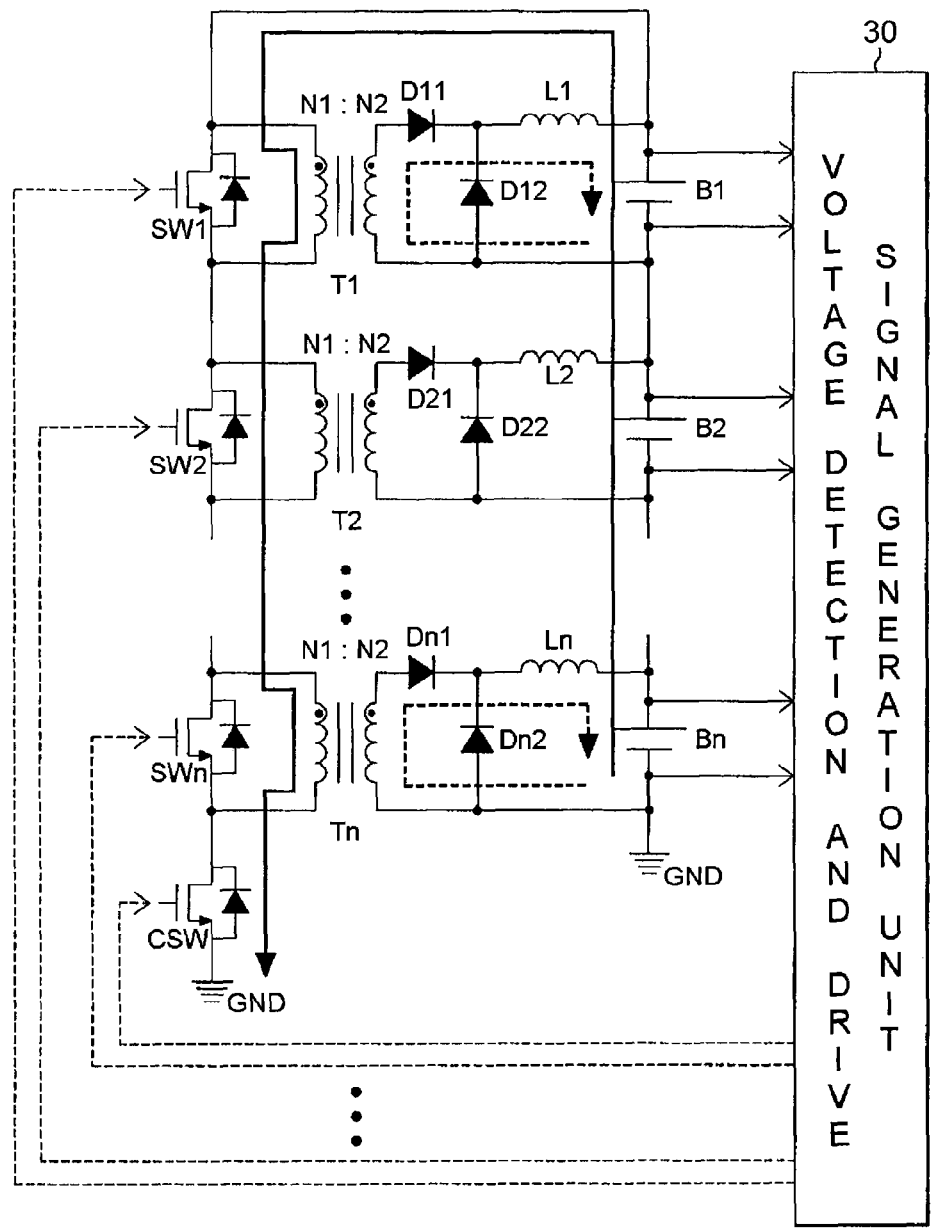
FIGS. 7 and 8 are diagrams showing closed loops for equalizing the charges of batteries in the charge equalization apparatus shown in FIG. 6.

Accordingly, as shown in FIG. 7, charges, discharged from the overcharged batteries, are converted into magnetic energy and are then stored in the primary windings of transformers T1 and Tn connected in parallel to the first battery B1 and the Nth battery Bn, and the charge control switches, connected in parallel to the batteries, other than the first battery B1 and the Nth battery Bn, form bypass circuits so that current does not flow through the primary windings of transformers connected in parallel to the batteries, other than the first battery B1 and the Nth battery Bn.

At this time, the energy, stored in the primary windings of the transformers T1 and Tn, connected in parallel to the first battery B1 and the Nth battery Bn, is transmitted to the secondary windings thereof, the magnetic energy transmitted to the secondary windings is converted into charges and the first battery B1 and the Nth battery Bn are charged with the charges via the first semiconductor switching elements D11 and Dn1 and the inductors L1 and Ln. Furthermore, the charge, supplied via the secondary windings, is converted into magnetic energy and is then stored in the inductors L1 and Ln.

Thereafter, the voltage detection and drive signal generation unit 30 supplies a low-state second drive signal to the redistribution switch CSW, thereby turning off the redistribution switch CSW.

Figure 8:
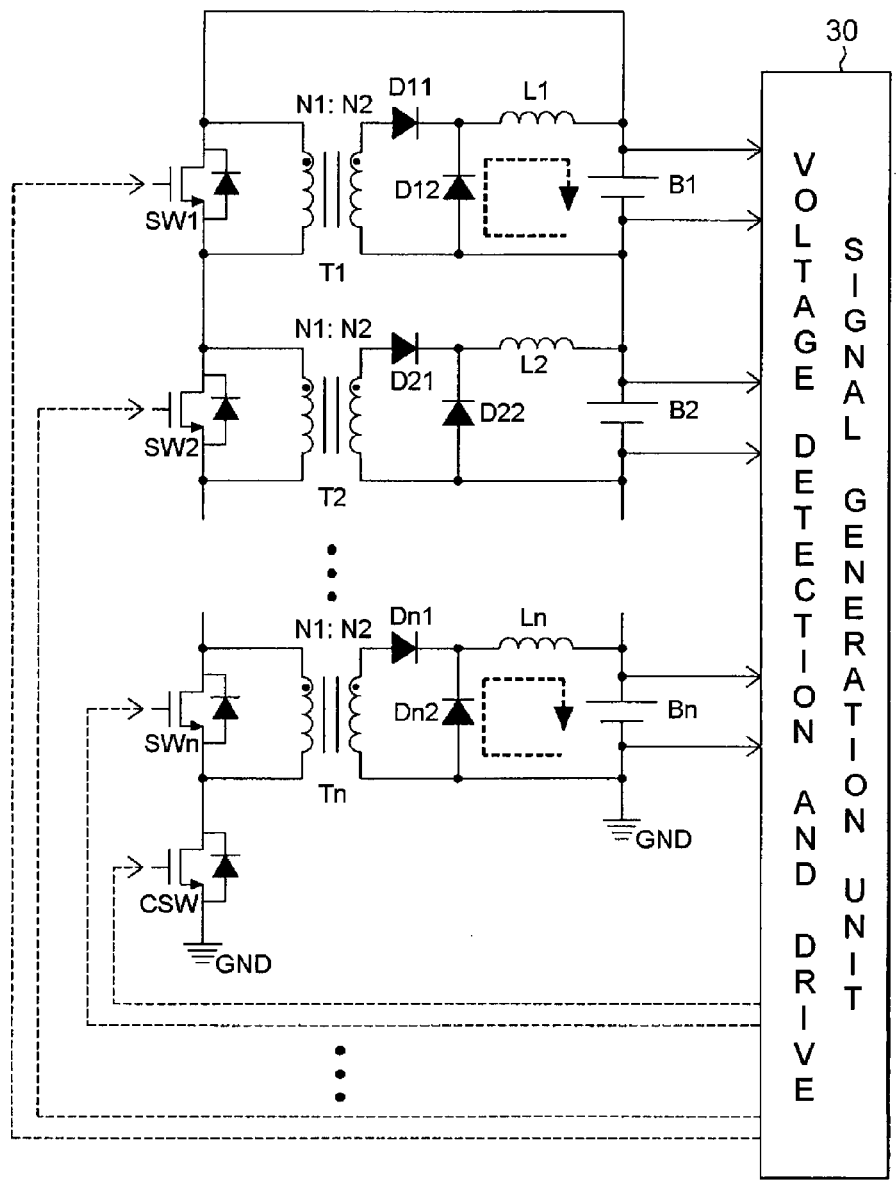

Accordingly, as shown in FIG. 8, magnetic energy, stored in the inductors L1 and Ln, is converted into a charge by counter electromotive force, and the first battery B1 and the Nth battery Bn are charged with the charge.

The above-described process is repeated until the voltages of the N series-connected batteries B1 to Bn are equalized. For this purpose, the voltage detection and drive signal generation unit 30 continuously detects the voltages of the N series-connected batteries B1 to Bn, generates a first drive signal and a second drive signal, and supplies the first and second drive signals to the charge control switches SW1 to SWn and the redistribution switch CSW.

Figure 9:
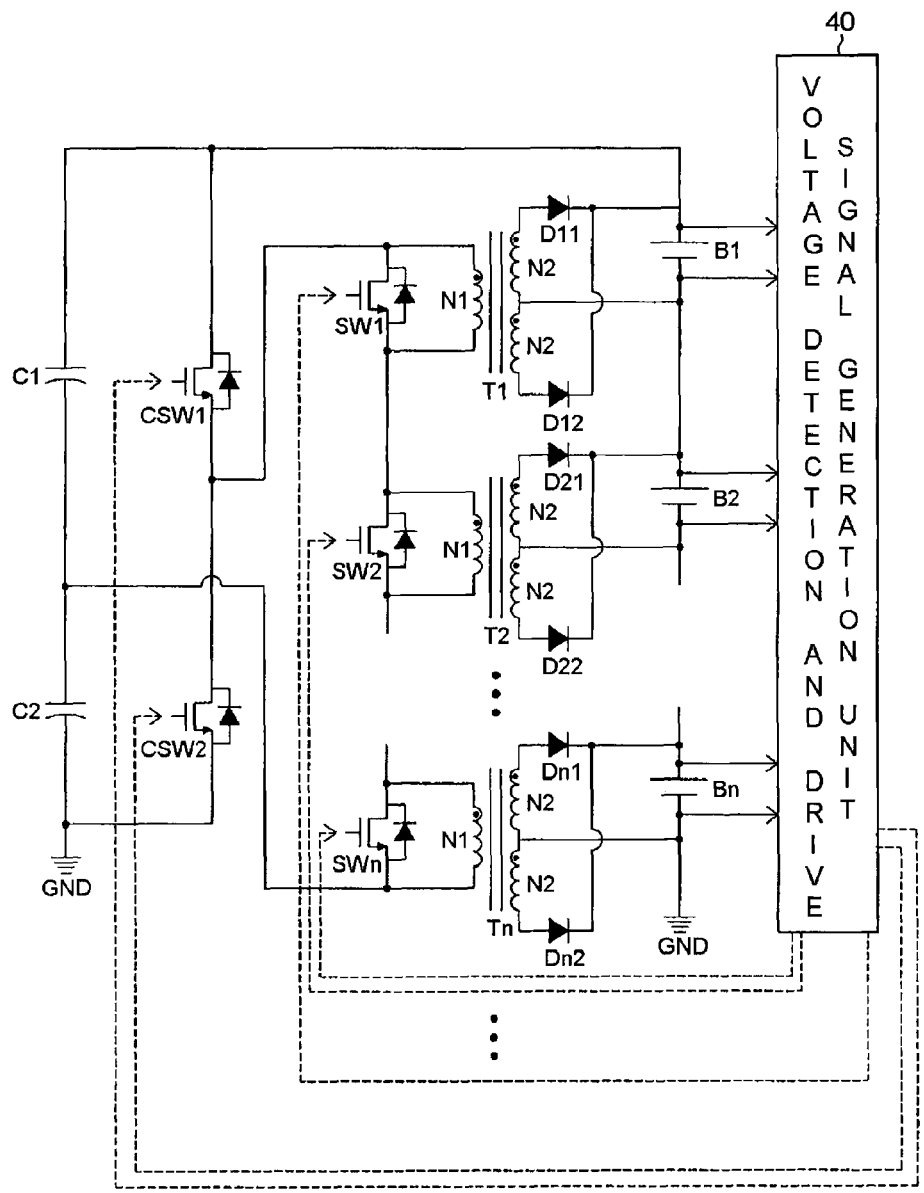
FIG. 9 is a diagram showing a charge equalization apparatus according to another embodiment of the present invention.

FIG. 9 is a diagram showing a charge equalization apparatus according to another embodiment of the present invention.

Referring to FIG. 9, the charge equalization apparatus according to the embodiment of the present invention includes N transformers T1 to Tn connected in parallel to N respective series-connected batteries B1 to Bn, a first charge storage device C1, a second charge storage device C2, a first redistribution switch CSW1, a second redistribution switch CSW2, N charge control switches SW1 to SWn connected in parallel to respective primary windings of the N transformers T1 to Tn, first semiconductor switching elements D11 to Dn1 connected in series to respective first secondary windings of the N transformers T1 to Tn, second semiconductor switching elements D12 to Dn2 connected in series to respective second secondary windings of the N transformers T1 to Tn, and a voltage detection and drive signal generation unit 40 adapted to detect the voltages of the batteries B1 to Bn and control the operation of the charge control switches SW1 to SWn and the redistribution switch CSW based on the detected values.

The transformers T1 to Tn are connected in parallel to N respective series-connected batteries B1 to Bn so as to reduce the voltages of overcharged batteries among the N series-connected batteries B1 to Bn and to charge the batteries, other than the overcharged batteries.

In greater detail, one end (the end where a dot is formed) of the first secondary winding of each of the transformers T1 to Tn is connected to the anode of each of the first semiconductor switching elements D11 to Dn1, the other end (the end where no dot is formed) of the second secondary winding is connected to the anode of each of the second semiconductor switching elements D12 to Dn2, and the cathode of each of the first semiconductor switching elements D11 to D1$n$ and the second semiconductor switching elements D12 to Dn2 is connected to the positive electrode of each of the batteries B1 to Bn.

Furthermore, the other end of each of the first secondary windings of the transformers T1 to Tn and one end of each of the second secondary windings are connected to the negative electrode of each of the batteries B1 to Bn, and each of the charge control switches SW1 to SWn is connected to both ends of each of the primary windings.

The transformers T1 to Tn are formed in a half-bridge converter type, in which a primary winding, a first secondary winding and a second secondary winding have the same polarity, that is, the dot of the primary winding and the dots of the first and second secondary windings are located on the same side, and each secondary winding is divided into two windings.

In this case, the turns ratio of the primary winding of each of the transformers T1 to Tn to the secondary winding thereof is N1:N2, and the first secondary winding and the second secondary winding have the same turns ratio.

The first charge storage device C1 and the second charge storage device C2 are each connected in parallel to the N series-connected batteries B1 to Bn and the transformers T1 to Tn, and store charges supplied from the N series-connected batteries B1 to Bn.

Although the first charge storage device C1 and the second charge storage device C2 are formed of capacitors, they may each be formed of any one of a capacitor and a battery. Furthermore, the first charge storage device C1 and the second charge storage device C2 have the same capacity.

The first redistribution switch CSW1 and the second redistribution switch CSW2 are each connected in parallel between the batteries B1 to Bn and each of the charge storage devices C1 and C2, and form closed loops in response to second drive signals from the voltage detection and drive signal generation unit 40 so as to discharge energy from overcharged batteries among the N series-connected batteries B1 to Bn and to charge the batteries, other than the overcharged batteries.

The first redistribution switch CSW1 and the second redistribution switch CSW2 are turned off when the high-state second drive signal is supplied from the voltage detection and drive signal generation unit 40, and are turned off when a low-state second drive signal is supplied therefrom.

That is, when energy is discharged from the overcharged batteries and the batteries, other than the overcharged batteries, are charged, the second redistribution switch CSW2 is turned off when the first redistribution switch CSW1 is turned on, and the second redistribution switch CSW2 is turned on when the first redistribution switch CSW1 is turned off.

The first redistribution switch CSW1 and the second redistribution switch CSW2 are connected in series between the positive electrode of the first battery B1 and a ground GND. Furthermore, a common node between the first redistribution switch CSW1 and the second redistribution switch CSW2 is connected to one end of the primary winding of the first transformer T1.

Although the first redistribution switch CSW1 and the second redistribution switch CSW2 are formed of N-type MOSFETs, they may each be formed of any one of switching elements such as a MOSFET, a BJT, and a relay.

The charge control switches SW1 to SWn are each connected between both ends of the primary winding of each of the transformers T1 to Tn. In response to a first drive signal from the voltage detection and drive signal generation unit 40, the charge control switches SW1 to SWn form bypass circuits so as to supply energy, discharged from one or more overcharged batteries among the N series-connected batteries B1 to Bn, to the primary windings of transformers connected in parallel to the batteries, other than the overcharged batteries, and to prevent current from flowing into the primary windings of the transformers connected in parallel to the overcharged batteries.

For this purpose, charge control switches connected in parallel to the overcharged batteries are supplied with a high-state first drive signal from the voltage detection and drive signal generation unit 40, and charge control switches connected in parallel to the batteries, other than the overcharged batteries, are supplied with a low-state first drive signal.

Accordingly, current flows through the primary windings of transformers connected in parallel to the batteries, other than the overcharged batteries, while current does not flow through the primary windings of transformers connected in parallel to the overcharged batteries, because the bypass circuits are formed by the charge control switches.

Although the charge control switches SW1 to SWn are formed of N-type MOSFETs, they may each be formed of any one of switching elements such as a MOSFET, a BJT, and a relay.

The first semiconductor switching elements D11 to Dn1 are each connected between one end (the end where a dot is formed) of the first secondary winding of each of the transformers T1 to Tn and the positive electrode of each of the batteries B1 to Bn, and operate such that energy from the first secondary windings of the transformers T1 to Tn is supplied to the batteries B1 to Bn.

The second semiconductor switching elements D12 to Dn2 are each connected between the other end (the end where no dot is formed) of the second secondary winding of each of the transformers T1 to Tn and the positive electrode of each of the batteries B1 to Bn, and operate such that energy from the second secondary windings of the transformers T1 to Tn is supplied to the batteries B1 to Bn.

Although the first semiconductor switching elements D11 to Dn1 are formed of diodes, they may each be formed of any one of switching elements such as a MOSFET, a BJT, a relay, and a diode.

The voltage detection and drive signal generation unit 40 detects respective voltages of the N series-connected batteries B1 to Bn, compares the detected voltages with a reference voltage, generates a first drive signal and a second drive signal for discharging energy from batteries having voltages higher than the reference voltage, that is, overcharged batteries, and charging the batteries, other than the overcharged batteries, if any one of the detected voltages is higher than the reference voltage, and supplies the first and second drive signals to the charge control switches SW1 to SWn, the first redistribution switch CSW1, and the second redistribution switch CSW2.

At this time, the voltage detection and drive signal generation unit 40 supplies a high-state first drive signal to the charge control switches connected in parallel to the overcharged batteries, and a low-state first drive signal to the charge control switches connected in parallel to the batteries, other than the overcharged batteries.

Furthermore, the voltage detection and drive signal generation unit 40 alternately supplies a high-state second drive signal and a low-state second drive signal to the first and second redistribution switches CSW1 and CSW2 when energy is discharged from the overcharged batteries and the batteries other than the overcharged batteries are charged with the energy.

In this case, the voltage detection and drive signal generation unit 40 alternately supplies narrow duty ratio PWM-based high-state and low-state second drive signals to the first and second redistribution switches CSW1 and CSW2 when only a small number of batteries are charged with charges at the time that almost all of the charge control switches are turned on, or the equalization of the charges of the batteries is almost completed. The reason for this is to discharge a small amount of charge from the N series-connected batteries from the beginning so as to prevent current from excessively flowing into a battery currently being charged.

Accordingly, the charge control switches connected in parallel to the overcharged batteries are turned on, while the charge control switches connected in parallel to the batteries, other than the overcharged batteries, are turned off. Furthermore, when energy is discharged from the overcharged batteries, and the batteries, other than the overcharged batteries, are charged with the energy, the first and second redistribution switches CSW1 and CSW2 are alternately turned on and off.

That is, when the first redistribution switch CSW1 is turned on and the second redistribution switch CSW1 is turned off, the charge control switches connected in parallel to the overcharged batteries are turned on to form bypass circuits so that current does not flow through the primary windings of the transformers connected in parallel to the overcharged batteries, and the charge control switches connected in parallel to the batteries, other than the overcharged batteries, are turned off so that current can flow through the primary windings of the transformers connected in parallel to the batteries, other than the overcharged batteries.

The voltage detection and drive signal generation unit 40 supplies a first drive signal and second drive signals to the charge control switches SW1 to SWn, the first redistribution switch CSW1 and the second redistribution switch CSW2 at the same time, or supplies second drive signals to the first redistribution switch CSW1 and the second redistribution switch CSW2 after supplying a first drive signal to the charge control switches SW1 to SWn. At this time, second drive signals having different states are supplied to the first redistribution switch CSW1 and the second redistribution switch CSW2.

For this purpose, the voltage detection and drive signal generation unit 40, as shown in FIG. 3, includes a sensing unit 22, a microprocessor 24, and a switch driving circuit unit 26.

The sensing unit 22 is connected to respective batteries B1 to Bn, and detects respective voltages of the batteries B1 to Bn.

The microprocessor 24 sets the average voltage of the batteries B1 to Bn, detected by the sensing unit 22, as a reference voltage, and sets the ON/OFF time of the charge control switches SW1 to SWn and the redistribution switches CSW1 and CSW2 for the charging/discharging of the batteries when a difference equal to or greater than a predetermined value exists between the reference voltage and one of the detected voltages detected by the sensing unit 22.

The switch driving circuit unit 26 generates a first drive signal and second drive signals in response to signals from the microprocessor 24, and supplies the generated signals to the charge control switches SW1 to SWn and the redistribution switches CSW1 and CSW2.

In the charge equalization apparatus according to the present embodiment of the present invention, small-capacity transformers are connected in parallel to respective series-connected batteries B1 to Bn regardless of the number of N series-connected batteries B1 to Bn, so that not only can excellent charge equalization characteristics be maintained, but the primary and secondary windings of the transformers can also be easily fabricated.

Furthermore, the charge equalization apparatus according to the present embodiment of the present invention can control the flow of charge to the batteries depending on respective charged states of the N series-connected batteries B1 to Bn with the help of the charge control switches SW1 to SWn connected in parallel to the primary windings of the transformers T1 to Tn.

Finally, the charge equalization apparatus according to the present embodiment of the present invention can prevent overcurrent from flowing into a battery currently being charged by controlling the PWM duty ratio of a second drive signal to be applied to the redistribution switch CSW when overcurrent flows into a small number of batteries at the time that the charge equalization of the batteries is almost completed, or at the time that almost all of the charge control switches are turned on.

A method of equalizing the voltages of the series-connected batteries using the charge equalization apparatus according to the present embodiment of the present invention is described below.

First, the voltage detection and drive signal generation unit 40 detects respective voltages of the N series-connected batteries B1 to Bn.

At this time, when one or more voltages higher than the reference voltage are detected from one or more of the N series-connected batteries B1 to Bn, the voltage detection and drive signal generation unit 40 generates a first drive signal for driving the charge control switches connected in parallel to the overcharged batteries so as to discharge energy from the overcharged batteries, and supplies the first drive signal to the charge control switches.

For example, when the batteries, other than a first battery B1 and an Nth battery Bn are overcharged, the voltage detection and drive signal generation unit 40 supplies a low-state first drive signal to charge control switches SW1 and SWn connected in parallel to the first battery B1 and the Nth battery Bn, and a high-state first drive signal to charge control switches connected in parallel to the batteries, other than the first battery B1 and the Nth battery Bn.

Furthermore, the voltage detection and drive signal generation unit 40 supplies a high-state second drive signal to the first redistribution switch CSW1, and a low-state second drive signal to the second redistribution switch CSW2.

Figure 10:
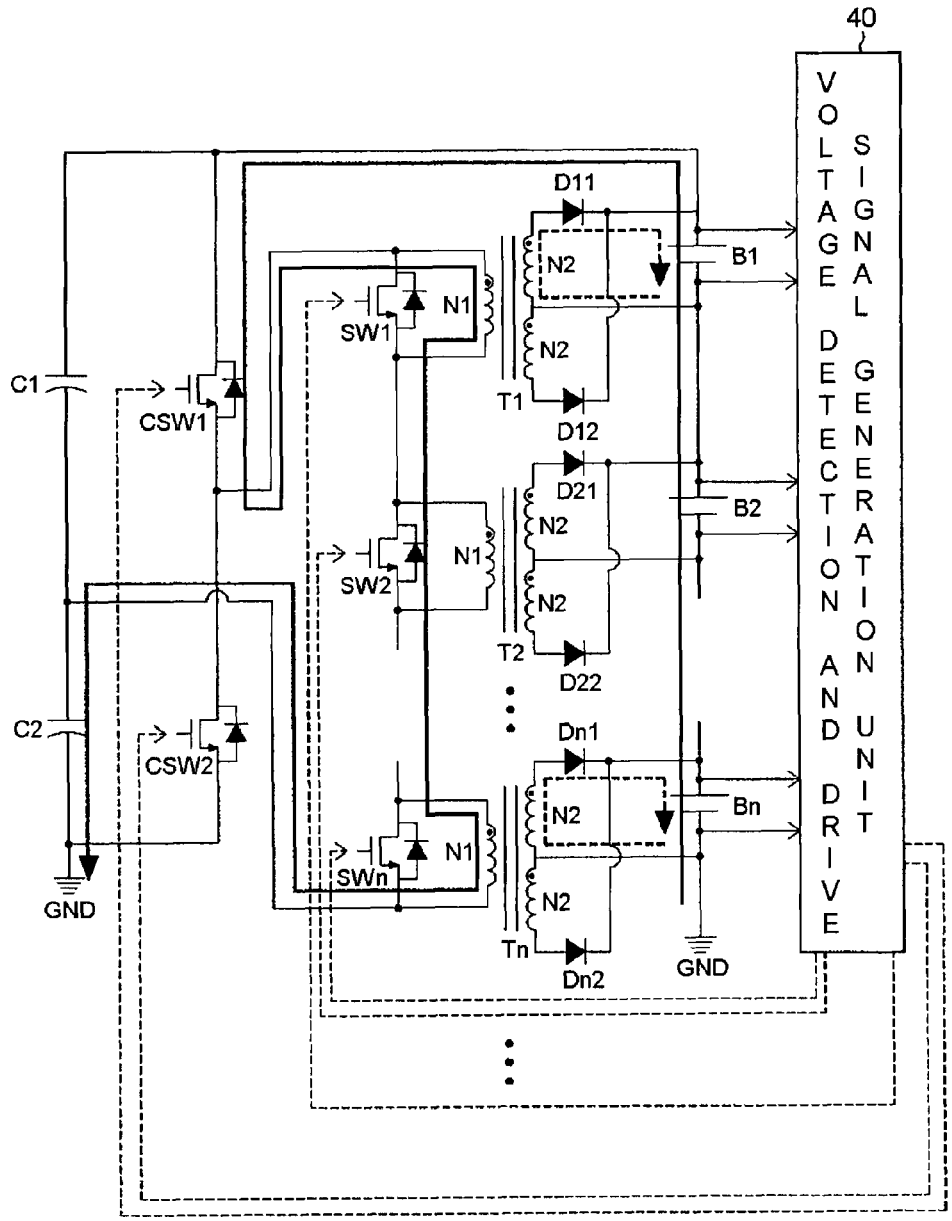
FIGS. 10 and 11 are diagrams showing closed loops for equalizing the charges of batteries in the charge equalization apparatus shown in FIG. 9.
Figure 11:
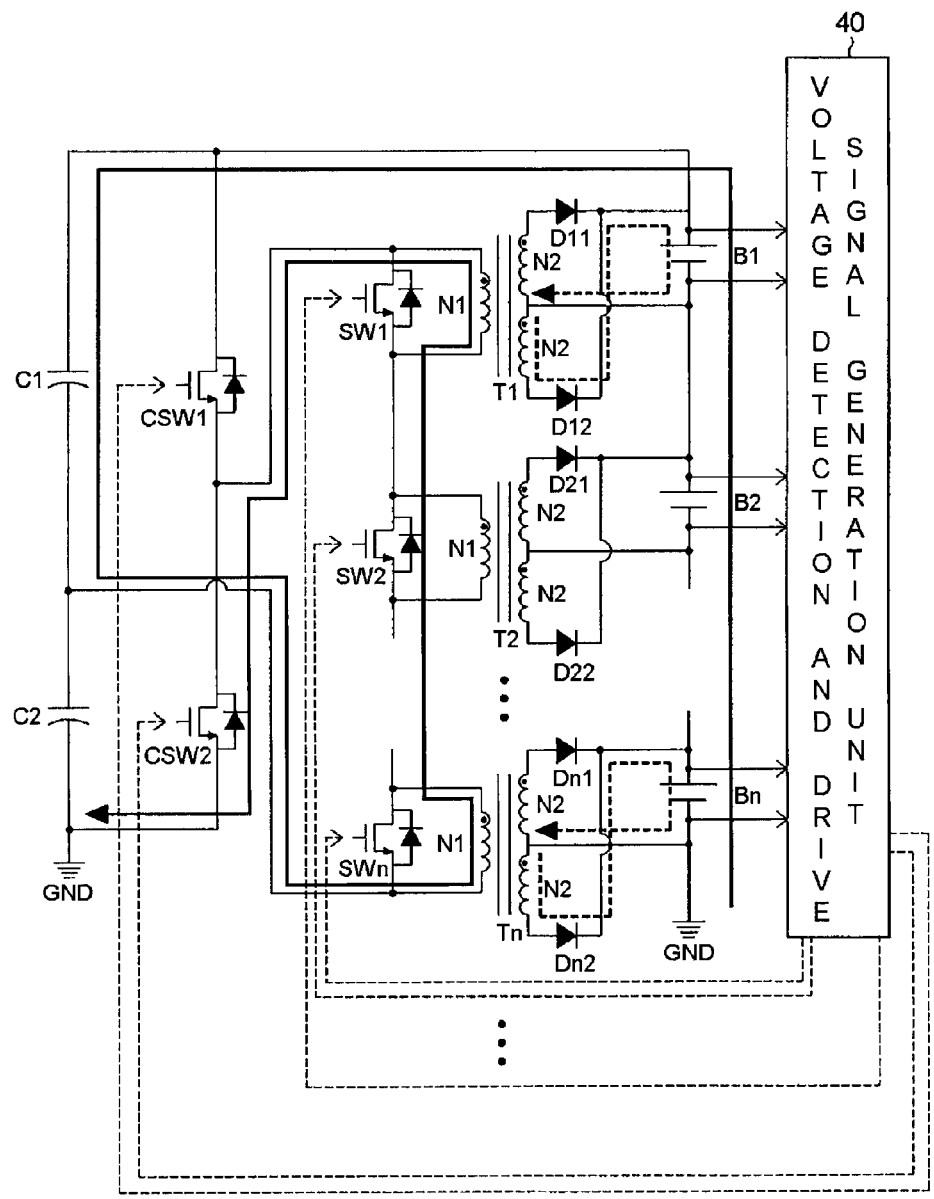

Accordingly, as shown in FIG. 10, current flows through the primary windings of transformers T1 and Tn connected in parallel to the first battery B1 and the Nth battery Bn, so that the energy supplied to the primary windings is supplied to the first and second batteries B1 and Bn via the secondary windings and the first semiconductor switching elements D11 to Dn1.

Accordingly, the first battery B1 and the Nth battery Bn are charged with energy that is supplied from the overcharged batteries.

At this time, current does not flow through the primary windings of the transformers T2 to Tn−1 connected in parallel to the batteries other than the first battery B1 and the Nth battery Bn because bypass circuits are formed by charge control switches.

Accordingly, the batteries, other than the first battery B1 and the Nth battery, discharge charges, and the internal voltages thereof are reduced.

As a result, as shown in FIG. 10, current flows through the primary windings of the transformers T1 and Tn connected in parallel to the first battery B1 and the Nth battery Bn, and the energy, supplied to the primary windings, is supplied to the first battery B1 and the Nth battery Bn via the secondary windings and the first semiconductor switching elements D11 to Dn1.

Accordingly, the first battery B1 and the Nth battery Bn are charged with energy that is supplied from the overcharged batteries.

At this time, the energy stored in the primary windings of the transformers T1 and Tn, connected in parallel to the first battery B1 and the Nth battery Bn, is transmitted to the second secondary windings, and the magnetic energy transmitted to the second secondary windings is converted into a charge and is then stored in the first battery B1 and the Nth battery Bn via the second semiconductor switching elements D12 and Dn2.

The above-described process is repeated until the voltages of the N series-connected batteries B1 to Bn are equalized. For this purpose, the voltage detection and drive signal generation unit 40 continuously detects the voltages of the N series-connected batteries B1 to Bn, generates a first drive signal and second drive signals, and supplies the first and second drive signals to the charge control switches SW1 to SWn, the first redistribution switch CSW1, and the second redistribution switch CSW2.

The invention claimed is:

1. A charge equalization apparatus, comprising:
    N transformers connected in parallel to N respective series-connected batteries, and configured to each include one primary winding and two secondary windings and to charge batteries, other than the overcharged batteries, with energy discharged from the overcharged batteries;
    a first charge storage device and a second charge storage device each connected in parallel to the N series-connected battery and the N transformer;
    a first redistribution switch and a second redistribution switch connected in series between the first and second charge storage devices and the N transformers;
    charge control switches each connected to both ends of a primary winding of each of the N transformers;
    N first semiconductor switching elements each connected to a first secondary winding of each of the N transformers and a positive electrode of each of the N batteries; and
    N second semiconductor switching elements each connected to a second secondary winding of each of the N transformers and a positive electrode of each of the N batteries.

2. The charge equalization apparatus as set forth in claim 1, wherein the first semiconductor switching elements and the second semiconductor switching elements are each any one of a MOSFET, a BJT, a relay and a diode.

3. The charge equalization apparatus as set forth in claim 2, wherein the first semiconductor switching elements and the second semiconductor switching elements are diodes.

4. The charge equalization apparatus as set forth in claim 3, wherein the charge control switches, the first redistribution switch and the second redistribution switch are each any one of a MOSFET, a BJT, and a relay.

5. The charge equalization apparatus as set forth in claim 4, wherein the charge control switches, the first redistribution switch and the second redistribution switch are and the redistribution switch are N-type MOSFETs.

6. The charge equalization apparatus as set forth in claim 5, wherein a turns ratio of a primary winding of each of the N transformers to a secondary winding thereof is N1:N2, which is identical for the first secondary windings and the second secondary windings.

7. The charge equalization apparatus as set forth in claim 6, wherein polarities of the primary windings, the first secondary windings and the second secondary windings are identical to each other.

8. The charge equalization apparatus as set forth in claim 7, wherein a common node of each of the first secondary windings and each of the second secondary windings is connected to a negative electrode of each of the batteries.

9. The charge equalization apparatus as set forth in claim 8, wherein the voltage detection and drive signal generation unit comprises:
   a sensing unit for detecting voltages of the N batteries;
   a microprocessor for setting ON/OFF time of the charge control switches and the redistribution switch based on the voltages detected by the sensing unit; and
   a switch driving circuit unit for generating a first drive signal and a second drive signal for driving the charge control switches and the redistribution switch in response to signals input from the microprocessor.

10. The charge equalization apparatus as set forth in claim 9, wherein the first charge storage device and the second charge storage device are each any one of a capacitor and a battery.

11. The charge equalization apparatus as set forth in claim 10, wherein the first charge storage device and the second charge storage device are capacitors.

* * * * *